Oct. 10, 1950

D. SILVERMAN 2,524,934

ELEVATION RECORDING APPARATUS

Filed Nov. 30, 1946

DANIEL SILVERMAN
*INVENTOR.*

BY Newell Pottoy
ATTORNEY

Oct. 10, 1950 D. SILVERMAN 2,524,934
ELEVATION RECORDING APPARATUS
Filed Nov. 30, 1946 3 Sheets-Sheet 2

DANIEL SILVERMAN
*INVENTOR.*

BY Newell Pottorf
ATTORNEY

Oct. 10, 1950     D. SILVERMAN     2,524,934

ELEVATION RECORDING APPARATUS

Filed Nov. 30, 1946     3 Sheets-Sheet 3

DANIEL SILVERMAN
*INVENTOR.*

BY *Newell Pottuf*

ATTORNEY

Patented Oct. 10, 1950

2,524,934

UNITED STATES PATENT OFFICE 2,524,934

ELEVATION RECORDING APPARATUS

Daniel Silverman, Tulsa, Okla., assignor to Stanolind Oil and Gas Company, Tulsa, Okla., a corporation of Delaware Application November 30, 1946, Serial No. 713,315

8 Claims. (Cl. 33—141.5)

This invention relates to the art of topographic surveying and is directed particularly to an elevation-measuring instrument of the gravity-pendulum type which records or plots the elevations along a traverse over which it is transported by a vehicle. Specifically, the invention comprises a method and means for correcting for the effects of acceleration or deceleration of the vehicle. These cause the reference direction pendulum to swing away from the true vertical position in which it should remain at all times if the grade angles of the path traversed are to be measured accurately.

Many different types of elevation-indicating and -plotting devices have been proposed, but nearly all of such instruments of the class to which this invention relates have in a common a gravity-responsive pendulum to furnish the reference direction from which the path deviations from the horizontal are measured, and an integration system which continuously forms the integral or summation of distance increments traveled times the sine of their respective angles of slope. The result of this integration is the elevation, which is either indicated in some way or plotted as a profile drawn on a chart.

As long as the transporting vehicle is at rest or moving at a uniform speed along a traverse, there are no forces tending to deflect the pendulum appreciably from its equilibrium position. However, during the starting and stopping of the vehicle as well as when changes in speed occur during travel there are unavoidable accelerations which tend to produce deflections of the pendulum. If these are uncompensated or unaccounted for in any way, serious errors may be introduced into the elevation indication or the plotted profile which would otherwise be quite accurate.

It may be expected that the deceleration in stopping the vehicle will produce an effect nearly equal and opposite to that of the acceleration in starting so that the readings taken with the vehicle at rest will be fairly accurate. This seems to be true, but it is not always desirable or possible to stop the vehicle for every reading; and, since, in plotting, the profile is being drawn continuously and only while the vehicle is in motion, an error is bound to appear on the trace unless steps are taken to prevent or correct it.

Some success has been attained at preventing the deflection of the pendulum by applying to it an equal and opposite force as disclosed in Cloud Patent 2,362,616. However, this complicates the construction of the pendulum in a number of respects, such as, for example, the requirement of supplying electrical current to the compensating coil on the pendulum over an insulated lead without introducing friction or hysteresis into the pendulum suspension. There are also other disadvantages in addition to the fact that adjustment to produce exact compensation for all conditions of acceleration seems impossible. The pendulum still undergoes occasional deflections in response to sudden jars, bumps, etc., although its amplitude of deflection or oscillation is greatly reduced.

It is accordingly a primary object of this invention to provide in a surveying apparatus a novel and improved means of correcting for vehicle accelerations which deflect the pendulum. Another object is to provide for an elevation meter of the type described a correction mechanism which requires no attachment to or complication of the pendulum construction. A further object is to provide a correction apparatus which cooperates with the integration mechanism of the surveying device so as automatically to give accurate readings or profile traces while the vehicle is in motion. A still further object is to provide correction apparatus for a pendulum-actuated surveying device which may be applied thereto without alterations to the existing equipment. This correction apparatus is in the form of an independent unit which may be coupled to the indicating or profile-drawing mechanism. Other objects, uses, and advantages of the invention will become apparent as the description proceeds.

For a better understanding of the principles and operation of this invention reference is made to the accompanying drawings which illustrate certain typical embodiments thereof. In these drawings, in which the same reference numeral in different figures is applied to the same or a corresponding part:

Figure 4 is a view of the embodiment of Figure 3 showing a slightly different arrangement of the parts which extends the range of vehicle speeds that may be corrected for;

Figure 1:
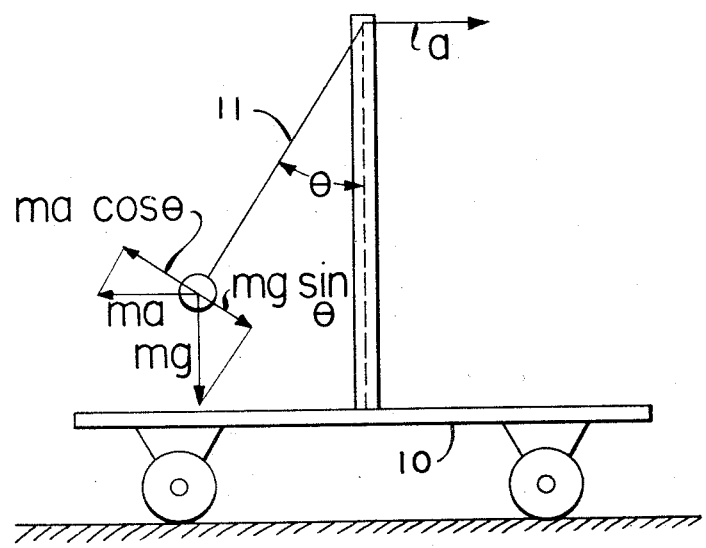
Figure 1 is a diagrammatic representation of the forces tending to deflect a pendulum during acceleration of its supporting vehicle.

Referring now to Figure 1, let us suppose that at a time $t$ during the acceleration from rest to a velocity $v$ of a vehicle 10 carrying a pendulum 11 of mass $m$, the acceleration has the value $a$. To an observer on the vehicle traveling with the pendulum it will appear that there is a force $ma$ deflecting the pendulum backward, which is the same direction as if the vehicle were going up a hill. The pendulum remains deflected in this direction by varying amounts throughout the entire period of acceleration. As a result there is added to the true elevation an apparent elevation or error making the indication or trace higher than it should be. The elevation error thus added is positive and can accordingly be corrected or eliminated by subtracting an equal amount from the resultant indication.

At the eqquilibrium angle of the deflection $\theta$ the forces acting on pendulum 11 to produce rotation about its point of support will appear to the observer on vehicle 10 to be balanced so that $$ma \cos \theta = mg \sin \theta \qquad (1)$$

As long as $\theta$ is fairly small, for example 10° or less, without introducing too great error for our present purposes we may consider $$\cos \theta = 1$$

so that the Equation 1 becomes $$ma = mg \sin \theta \qquad (2)$$

or $$\sin \theta = \frac{a}{g} \qquad (3)$$

Now, the apparent elevation or elevation error $\delta$ introduced while traveling the increment of distance $ds$ during the acceleration $a$ and while the pendulum was deflected at the angle $\theta$ is $$\delta = \sin \theta \, ds \qquad (4)$$

so that the total $\Delta$ introduced during the period of acceleration from zero to velocity $v$ is $$\Delta = \sum_0^v \delta = \int_0^v \sin \theta \, ds \qquad (5)$$

and substituting from Equation 3

$$\Delta = \int_0^v \frac{a}{g} ds$$

But since the acceleration $$a = \frac{dv}{dt}$$

and the distance increment $$ds = v \, dt$$

the expression for $\Delta$ becomes $$\Delta = \frac{1}{g} \int_0^v \frac{dv}{dt} v \, dt$$

$$= \frac{1}{g} \int_0^v v \, dv$$

$$= \frac{1}{2g} [v^2]_0^v$$

or $$\Delta = \frac{v^2}{2g} \qquad (6)$$

Thus it appears that the total error $\Delta$ in a reading made or an indication recorded while vehicle 10 is in motion is, within the limits of the assumption made, dependent only on the vehicle velocity $v$ at the instant of making the reading. It will be noted that this agrees with the finding that readings taken when the vehicle is at rest are generally fairly accurate because of the approximate canceling of acceleration effects by the opposite effects during deceleration.

Figure 2:
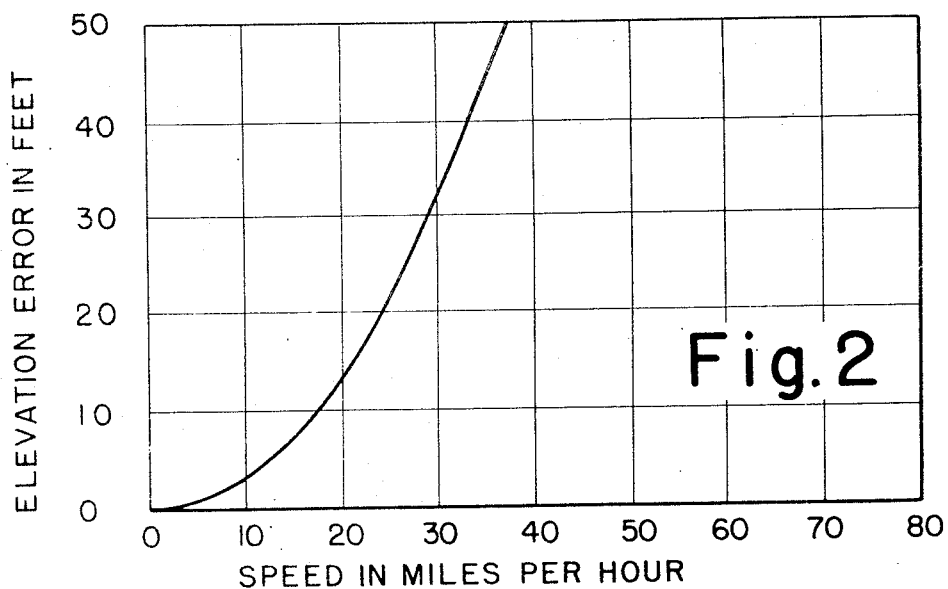
Figure 2 is a graph showing the elevation error arising from this effect as a function of vehicle speed.

The actual magnitude of the error as a function of the vehicle speed is shown in Figure 2. While the elevation error at 10 miles per hour or less does not greatly exceed about 3 feet, which might be tolerated for some purposes, the error clearly becomes too large for toleration at such reasonable vehicle speeds as 20 to 30 or 40 miles per hour. At the latter speed, for example, the error has increased to more than 50 feet.

The essence of my invention by which the necessary correction is determined and applied to an elevation indicator or recorder therefore includes a means which produces at all times an electrical output proportional to the velocity $v$ of vehicle 10, means for producing from this electrical output a motion corresponding to $v^2$, and means utilizing this motion to adjust the indicating or recording mechanism so as to produce a true reading or draw a correct elevation profile on the chart paper.

Figure 3:
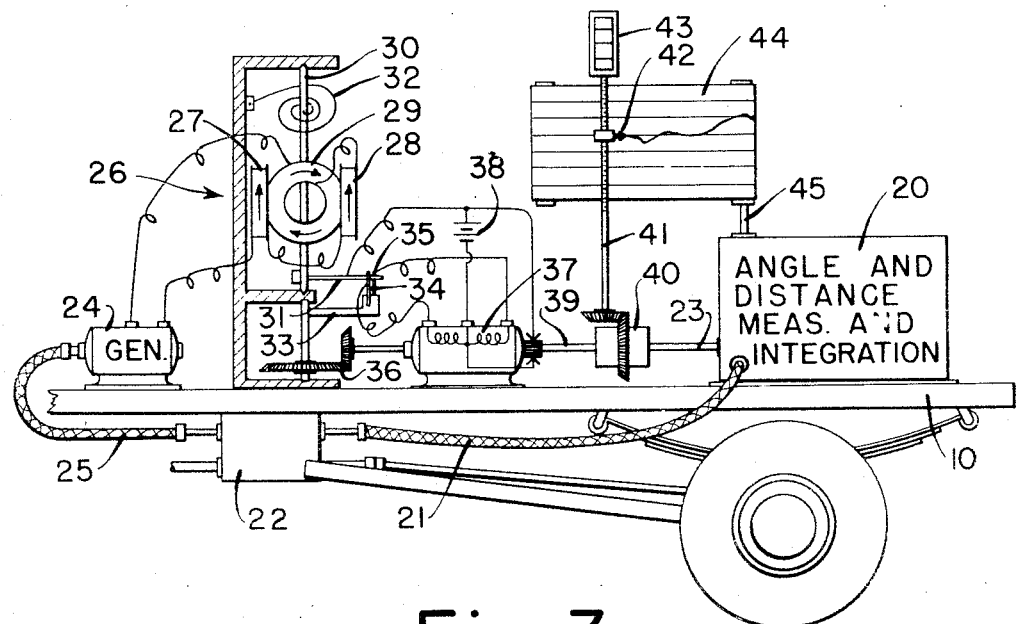
Figure 3 is a view partially diagrammatic of one embodiment of the invention.

In the embodiment shown in Figure 3 the angle and distance measuring and integrating mechanism 20 may be of any suitable type, for example, one such as that disclosed in the aforementioned Cloud Patent 2,362,616, except for the fact that no means is provided to reduce or compensate the tendency of the pendulum to deflect during acceleration or deceleration of the vehicle. The only force applied to the pendulum other than gravity and the vehicle accelerations is a damping force to reduce or eliminate oscillations about an equilibrium position. This integrating mechanism 20 may be driven according to the distance traveled by the vehicle 10 through a flexible driving connection 21 operated from the transmission 22 of the vehicle or connected at some other appropriate point such as to the vehicle front wheel. The integrating mechanism 20 accordingly measures the particular angles and the corresponding distance increments traveled and forms the integral of the product of these quantities, as is well known in the art, producing a rotation of an output shaft 23 proportional to the apparent change in elevation. This rotation, of course, includes the error introduced by the deflection of the pendulum during the period of acceleration or deceleration of vehicle 10.

In order to correct for this error I provide an electric generator 24 driven by a flexible connection 25, similar to connection 21, at a speed proportional to the vehicle speed. Generator 24 accordingly produces an electrical output current or voltage which is then applied to the coils of an electrodynamometer 26 comprising a pair of fixed coils 27 and 28 and a movable coil 29 all connected in series. Coil 29 is fixed to a shaft 30 carrying a pointer 31, the tendency of the shaft to rotate due to interaction of the fixed and moving coils when carrying electric current being balanced by the torque of a ribbon or hair spring 32. It will be seen that this arrangement resembles an electrodynamometer type of voltmeter, the rotation of which is proportional to the square of the applied voltage, as is well known.

In order to avoid placing a load on it, the motion of pointer 31 is preferably followed by an arm 33 carrying a pair of electrical contacts 34 and 35, which arm may be moved in accordance with the motion of pointer 31 by a gear 36 driven by a servomotor 37. This motor is connected to and driven by current from a battery 38 and is reversible, depending on which one of the contacts 34 and 35 is contacted by the pointer 31, so as to move the corresponding contact away from the pointer. The output shaft 39 of the motor 37 therefore rotates from a zero position by an amount or angle proportional to the square of the speed of vehicle 10. By combining this rotation of shaft 39 and the uncorrected elevation rotation of shaft 23 in a differential 40 and applying the resultant to the lead screw 41, which drives the profile plotting stylus 42 or the counter-indicating 43, a corrected resultant rotation of screw 41 or reading of counter 43 is achieved. The chart 44 on which the profile is plotted by stylus 42 may be driven either according to the horizontal projection of the distance traveled along the traverse or according to the linear distance traveled by a suitable driving connection 45 from the integration mechanism 20, as desired. Although both an indicator 43 and a profile-plotting device are shown, it is apparent that either one can be used alone if preferred, as either the indication of elevation or the plot of the profile is corrected by this embodiment of the invention.

Figure 4:
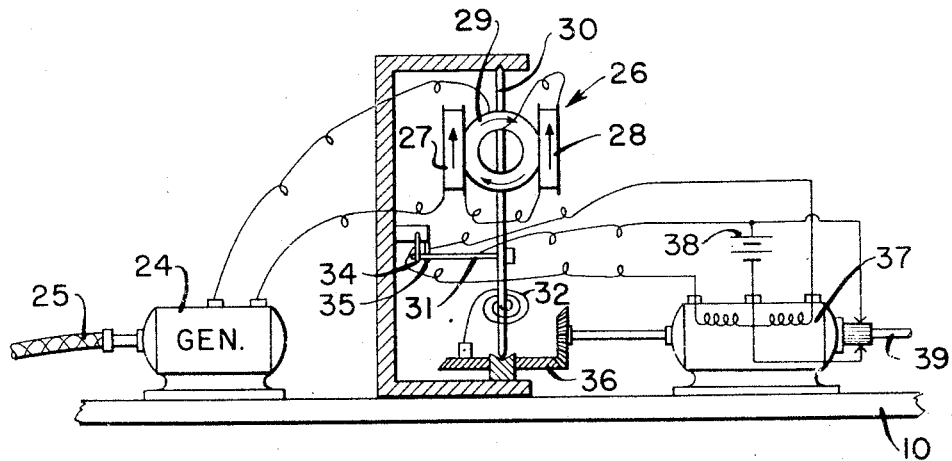

Since the rotation of shaft 30 and the movement of pointer 31 is proportional to the square of the vehicle speed only over a limited angular range of rotation, an arrangement such as that shown in Figure 4 may be preferable for a wider range of vehicle speeds. The apparatus of Figure 4 is generally similar to that of Figure 3 except that the contacts 34 and 35 are fixed to the frame supporting the shaft 30, and the torque of spring 32 is regulated by the gear 36 driven by servomotor 37. With this arrangement it is apparent that the rotation of the motor output shaft 39 can extend through a considerably greater range than in Figure 3, while varying the torque of spring 32 in such a way as to maintain the pointer 31 between the contacts 34 and 35. Since the angular relationship of the stationary coils 27 and 28 and the movable coil 29 does not change, the force exerted by the spring 32 is thus closely proportional to the vehicle velocity squared over a large range.

Figure 5:
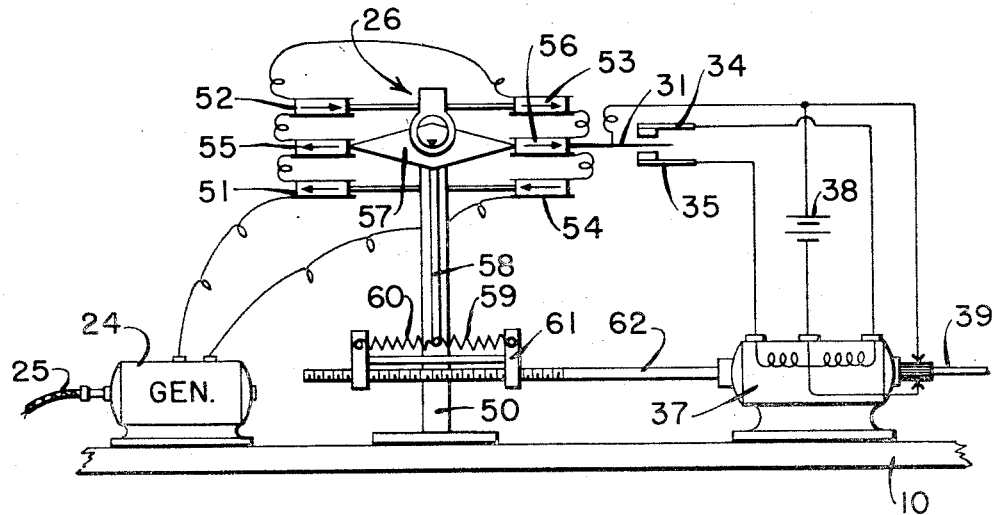
Figure 5 is a view, partially diagrammatic, of a preferred embodiment of the invention.

In Figure 5 is shown a preferred arrangement of the dynamometer moving and fixed coils in which the relationship between the vehicle speed and the force of interaction between the coils is very accurate. Fixed to an upright 50 are two pairs of stationary coils 51, 52 and 53, 54. Two movable coils 55 and 56 are carried at the ends of a beam 57 pivoted at its center to the upright 50. The coil 55 is accurately centered between the pair of stationary coils 51 and 52, while the coil 56 is similarly spaced midway between stationary coils 53 and 54. The movable pointer 31 on one end of the beam 57 makes electrical contact with one or the other of the fixed contacts 34 or 35 driving the servomotor 37 in one direction or the other as in the previous embodiments. The balancing force to maintain the pointer 31 centered between the stationary contacts 34 and 35 may be applied to the beam 57 through an arm 58 connected by springs 59 and 60 to a nut 61 moved laterally by the threaded shaft 62 of the servomotor 37. Preferably all of the moving and fixed coils of this embodiment are connected in series and to the generator 24 as in the previous embodiment. In this case the rotation of output shaft 39 may be utilized in the same manner as in the apparatus of Figure 3.

Figure 6:
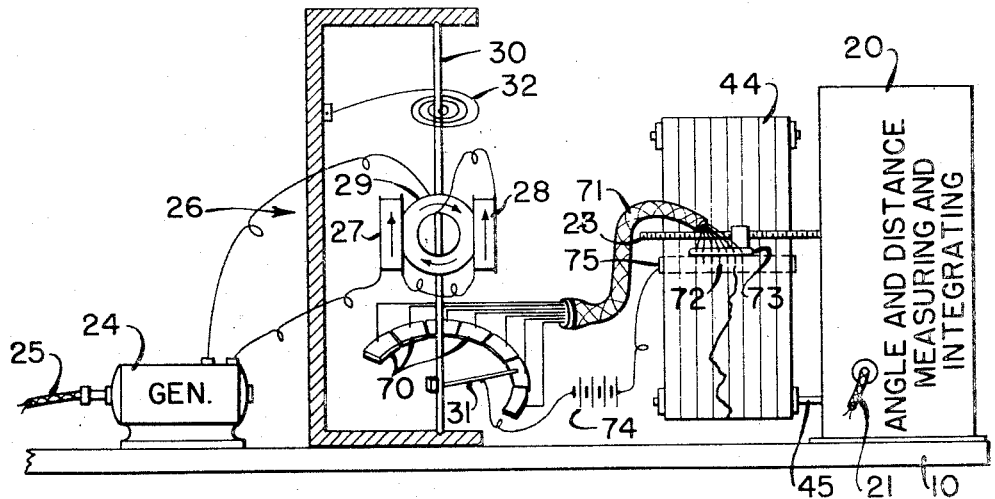
Figure 6 is a view, partially diagrammatic, of a third embodiment of the invention.

In Figure 6 is shown an alternative embodiment of my invention illustrating its application to a somewhat different type of profile-tracing mechanism. As in the previous embodiments, the electrical output of the generator 24, proportional to the speed of vehicle 10, brings about a rotation of the shaft 30 and angular movement of the pointer 31 proportional to the square of the vehicle speed. In this embodiment, however, the pointer 31 acts as the arm of a selector switch contacting one of a plurality of insulated equally spaced segments 70, each of which is connected by an insulated lead in a multiconductor cable 71 to one of a series of insulated contact points 72 bearing against the surface of chart 44. In this embodiment the chart paper is preferably of a type which changes color at the point of application of electric current thereto, such as, for example, the recording paper known commercially as "Teledeltos" and described in U. S. Patent 2,251,742.

The contact points 72 are preferably spaced equally in a row in the form of a comb unit 73 aligned transversely to the direction of motion of chart 44, the point spacing being so related to the elevation scale of the chart as to be equal to the elevation error permissible for the profile trace. That is, if it is desired that the trace always be accurate within 2 feet, then the contact spacing in the comb unit 73 must not exceed a distance equal to 2 feet on the chart scale. Likewise the angular range covered by each one of the segments 70 corresponds to a two-foot elevation change due to the vehicle acceleration. Comb unit 73 is shifted across chart 44 by the rotation of the lead screw 23, which is the output shaft of the integrating mechanism 20, the rotation of which is uncorrected for the effects of vehicle acceleration.

The elevation profile is traced on the chart 44 by passing current from one terminal of a battery 74 through the pointer 31 and the appropriate one of contacts 72 according to the segment 70 of the selector switch selected by pointer 31. The electrical circuit is completed to the battery 74 by a backing plate 75 on the under side of chart 44, which is connected to the other terminal of the battery.

It is believed apparent that the apparatus of Figures 3, 4, and 5 can be adapted to this type of recording simply by placing the pointer 31 on the output shaft 39 of servomotor 37 and moving it across the switch segments 70. It is believed apparent also that the embodiments described provide a compact and effective means of correcting the elevation indication or plotted profile without any cumbersome connections to the remainder of the elevation-integrating apparatus. The construction of the gravity-responsive pendulum and the other parts of the integrating mechanism is accordingly simplified, and the correcting unit is one which may be incorporated or not according to the need for applying such a correction.

While I have described my invention in terms of certain specific embodiments thereof, it is apparent that a number of modifications are possible and will occur to those skilled in the art. Therefore, the scope of the invention should not be considered as limited to the exact details of the described embodiments but is best defined by the scope of the following claims.

I claim:

1. In elevation-surveying apparatus of the type including a gravity-responsive pendulum for supplying a reference direction for the measurement of grade angles, said pendulum being responsive also to accelerations of the transporting vehicle along the traversed path, means for correcting the elevation indications of said apparatus while said vehicle is in motion for the error introduced by said accelerations comprising: means for producing an electrical output proportional to the vehicle speed, means actuated by said electrical output for producing a motion proportional to the square of the vehicle speed, and means utilizing said motion for altering the elevation indications of said apparatus whereby substantially correct values thereof are given while said vehicle is in motion.

2. In elevation-surveying apparatus of the type including a gravity-responsive pendulum for supplying a reference direction for the measurement of grade angles, said pendulum being responsive also to accelerations of the transporting vehicle along the traversed path, means for correcting the elevation indications of said apparatus while said vehicle is in motion for the error introduced by said accelerations comprising: an electric generator coupled to said vehicle so as to be driven proportional to the vehicle speed, an electrodynamometer actuated by the output of said generator and producing a movement proportional to the square of the vehicle speed, and means utilizing said movement for subtracting from the elevation indications of said apparatus a quantity proportional to the square of the vehicle speed.

3. In a gravity-pendulum type of elevation-surveying apparatus adapted for transportation by a vehicle, an acceleration-correction means comprising: means for producing an electrical output proportional to the vehicle speed, an electrodynamometer actuated by said output and having movable and fixed coils, the force of interaction between said coils being proportional to the square of the vehicle speed, and means utilizing said interaction force for subtracting from the elevation indications of said apparatus a quantity proportional to the square of the vehicle speed.

4. In a gravity-pendulum type of elevation-surveying apparatus adapted for transportation by a vehicle, an acceleration-correction means comprising: means for producing an electrical output proportional to the vehicle speed, an electrodynamometer actuated by said output and having movable and fixed coils, the force of interaction between said coils being proportional to the square of the vehicle speed, a reversible follower means responsive to said interaction for producing a motion proportional to the square of said vehicle speed, and means actuated by said follower means for subtracting from the elevation indications of said apparatus a quantity proportional to the square of said vehicle speed.

5. In a gravity-pendulum type of elevation-surveying apparatus adapted for transportation by a vehicle, an acceleration-correction means comprising: means for producing an electrical output proportional to the vehicle speed, an electrodynamometer actuated by said output and having movable and fixed coils, the force of interaction between said coils being proportional to the square of the vehicle speed, means resiliently balancing the force of interaction of said movable and said fixed coils, a reversible follower means for adjusting said resilient means whereby said follower means moves by an amount proportional to said force, said follower means being adapted to subtract from the elevation indications of said apparatus a quantity proportional to the square of the vehicle speed.

6. In a gravity-pendulum type of elevation-surveying apparatus adapted for transportation by a vehicle, an acceleration-correction means comprising: means for producing an electrical output proportional to the vehicle speed, an electrodynamometer actuated by said output and having movable and fixed coils, the force of interaction between said coils being proportional to the square of the vehicle speed, an electrical contactor actuated by said movable coil between a pair of fixed electrical contacts, a source of voltage and a reversible follower means adapted to be driven thereby upon contact between said movable contactor and one of said fixed contacts, the direction of movement of said follower being dependent upon which of said fixed contacts is contacted, and the amount of said movement being proportional to said force, and means operated by said follower means for subtracting from the elevation indications of said apparatus a quantity proportional to the square of the vehicle speed.

7. In a gravity-pendulum type of elevation-surveying apparatus adapted for transportation by a vehicle, an acceleration-correction means comprising: means for producing an electrical output proportional to the vehicle speed, an electrodynamometer actuated by said output and having two pairs of spaced fixed coils and a movable coil mounted on each end of a pivoted beam and centered between each of said pairs of fixed coils, the force of interaction between said fixed and movable coils being proportional to the square of the vehicle speed, an electrical contactor actuated by the motion of said beam and movable between a pair of fixed electrical contacts, a source of electric power and a reversible means actuated thereby through said fixed and said movable electrical contacts, resilient means adjusted by said reversible means for balancing the force of interaction between said fixed and said movable coils whereby the movement of said reversible means is proportional to said force, and means actuated by said reversible means for subtracting from the elevation indications of said apparatus a quantity proportional to the square of the vehicle speed.

8. In a gravity-pendulum type of elevation-surveying apparatus adapted for transportation by a vehicle, an acceleration-correction means comprising: means for producing an electrical output proportional to the vehicle speed, an electrodynamometer actuated by said output and having movable and fixed coils, the force of interaction between said coils being proportional to the square of the vehicle speed, resilient means balancing said force of interaction, a plurality of equally spaced switch contact segments each connected to one of a plurality of spaced electrical recording contact points for marking an electric-current-sensitive record chart, and a switch selector arm actuated from said movable coil in proportion to said force for contacting one of said segments and applying recording current to said chart whereby the elevation indication of said apparatus is reduced by an amount substantially proportional to the square of the vehicle speed.

DANIEL SILVERMAN.

No references cited.